United States Patent
Hufnagel et al.

(10) Patent No.: US 9,346,091 B2
(45) Date of Patent: May 24, 2016

(54) SAFETY DEVICE FOR A MACHINE IN WHICH A FIRST MACHINE PART PERFORMS A WORKING MOVEMENT WITH RESPECT TO A SECOND MACHINE PART

(71) Applicant: Pilz GmbH & Co. KG, Ostfildern (DE)

(72) Inventors: Mark Hufnagel, Ostfildern (DE); Roland Leibfarth, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 408 days.

(21) Appl. No.: 13/629,848

(22) Filed: Sep. 28, 2012

(65) Prior Publication Data

US 2013/0026346 A1   Jan. 31, 2013

Related U.S. Application Data

(63) Continuation of application No. PCT/EP2011/054861, filed on Mar. 29, 2011.

(30) Foreign Application Priority Data

Mar. 29, 2010  (DE) ............... 20 2010 004 438 U

(51) Int. Cl.
*B21D 55/00* (2006.01)
*B21D 5/02* (2006.01)
(Continued)

(52) U.S. Cl.
CPC ....... *B21D 5/02* (2013.01); *B21D 55/00* (2013.01); *B30B 15/285* (2013.01); *F16P 3/144* (2013.01)

(58) Field of Classification Search
CPC ........ H01L 27/146; B21D 5/02; B21D 55/00; B30B 15/285
USPC ............. 250/208.1, 216, 221, 559.12, 559.3, 250/559.33, 559.36, 559.34; 356/23, 25, 356/32–35, 395, 396; 340/556, 557, 559, 340/555
See application file for complete search history.

(56) References Cited

U.S. PATENT DOCUMENTS

| 4,166,369 A | 9/1979 | Nakajima |
| 5,579,884 A | 12/1996 | Appleyard et al. |

(Continued)

FOREIGN PATENT DOCUMENTS

| AU | 0 566 795 | 5/1985 |
| CN | 101652598 | 2/2010 |

(Continued)

OTHER PUBLICATIONS

IPEA/EP; English language translation of International Preliminary Report on Patentability (Chapter II); issued by WIPO; 10 pp.

(Continued)

*Primary Examiner* — Georgia Y Epps
*Assistant Examiner* — Don Williams
(74) *Attorney, Agent, or Firm* — Harness, Dickey & Pierce, P.L.C.

(57) ABSTRACT

A safety device for a machine, in which machine a first machine part having a leading edge performs a working movement towards a second machine part, comprises a plurality of optical safety barriers and an evaluation unit. The optical safety barriers move in the working movement simultaneously with the first machine part in such a manner that the safety barriers move in advance of the leading edge at various spaced dispositions. The optical safety barriers span a protective field that has a two-dimensional cross section. The evaluation unit is designed for generating a stop signal to stop the first machine part in dependence upon the optical safety barriers. Towards the end of the working movement, the optical safety barriers are held substantially stationary in the region of the second machine part. The optical safety barriers are deactivated one following the other before they are interrupted by the first machine part.

23 Claims, 4 Drawing Sheets

(51) Int. Cl.
    *B30B 15/28*     (2006.01)
    *F16P 3/14*     (2006.01)

(56) References Cited

U.S. PATENT DOCUMENTS

| | | | |
|---|---|---|---|
| 6,316,763 | B1 | 11/2001 | Appleyard et al. |
| 6,677,574 | B2 | 1/2004 | Fiessler |
| 7,034,929 | B2 | 4/2006 | Bergbach et al. |
| 7,080,534 | B2 | 7/2006 | Schneiderheinze |
| 7,448,242 | B2 * | 11/2008 | Dieterle et al. ................. 72/21.1 |
| 7,454,935 | B2 | 11/2008 | Braune et al. |
| 7,578,156 | B2 | 8/2009 | Braune et al. |
| 8,119,964 | B2 | 2/2012 | Hufnagel et al. |
| 2007/0214854 | A1 * | 9/2007 | Braune et al. ..................... 72/8.1 |
| 2010/0012821 | A1 | 1/2010 | Hufnagel et al. |

FOREIGN PATENT DOCUMENTS

| | | |
|---|---|---|
| DE | 852 037 | 10/1952 |
| DE | 27 50 234 | 1/1979 |
| DE | 197 17 299 A1 | 2/1998 |
| DE | 100 27 156 A1 | 12/2001 |
| DE | 101 14 784 A1 | 10/2002 |
| DE | 202 17 426 U1 | 2/2003 |
| DE | 101 43 505 A1 | 3/2003 |
| DE | 102 46 609 A1 | 2/2004 |
| DE | 102 47 136 A1 | 4/2004 |
| DE | 103 09 399 A1 | 9/2004 |
| DE | 103 53 353 A1 | 6/2005 |
| DE | 10 2004 020 024 A1 | 11/2005 |
| DE | 10 2004 058 472 A1 | 6/2006 |
| DE | 10 2007 006 306 A1 | 7/2008 |
| EP | 1 319 886 A2 | 6/2003 |
| EP | 1 387 121 A2 | 2/2004 |
| EP | 1 674 785 A1 | 6/2006 |
| EP | 1 674 785 B1 | 6/2006 |
| GB | 1 307 078 | 2/1973 |
| WO | WO 00/67932 | 11/2000 |
| WO | WO 03/080268 A1 | 10/2003 |
| WO | WO 2006/135961 A1 | 12/2006 |

OTHER PUBLICATIONS

Jacobson, Jan; IEC 61496: A Safety Standard for Electrosensitive Protective Equipment; Mar.-Apr. 1999; 6 pp.

EN ISO 13849-1; Safety of machinery—Safety-related parts of control systems—Part 1: General principles for design (ISO 13849-1:2006); Nov. 2006; 97 pp.

DIN EN 954-1; Safety of machinery—Safety-related parts of control systems—Part 1: General principles for design; Mar. 1997; 34 pp.

CEI IEC 61508-2; Functional safety of electricallelectronic/programmable electronic safety-related systems—Part 2: Requirements for electrical/electronic/programmable electronic safety-related systems; May 2005; 152 pp.

* cited by examiner

SAFETY DEVICE FOR A MACHINE IN WHICH A FIRST MACHINE PART PERFORMS A WORKING MOVEMENT WITH RESPECT TO A SECOND MACHINE PART

CROSS REFERENCES TO RELATED APPLICATIONS

This application is a continuation of international patent application PCT/EP2011/054861 filed on Mar. 29, 2011 designating the U.S., which international patent application has been published in German language and claims priority from German patent application DE 20 2010 004 438.3 filed on Mar. 29, 2010. The entire contents of these priority applications are incorporated herein by reference.

BACKGROUND OF THE INVENTION

The present invention relates to a safety device for a machine having a first machine part that performs a working movement towards a second machine part.

A known method of processing workpieces in a non-cutting manner is to bend workpieces or bend the edges of workpieces. In so doing, an initially flat workpiece is reshaped under pressure in the region of the processing site. In the case of machine processing, machines used for this purpose are referred to generally as press brake. However, the invention is not limited to press brake machines in the narrower sense and can likewise be used in edge-press brake machines, stamping machines, cutting machines and other machines in which two machine parts perform a dangerous working movement towards each other and in which in order to avoid accidents a protective device is provided that moves simultaneously and acts in a non-contact manner.

In the case of press brake machines, shaping of the workpiece is performed substantially by virtue of the fact that the workpiece is pressed against a die using a bending punch. A desired shaping is achieved by a corresponding design of the bending punch and the die. The bending punch is often a tool that is arranged in a movable upper tool-carrier, whereas the die sits on a fixed lower tool-carrier. However, since it concerns only the relative movement of the two tool-carriers, as an alternative, the die can also be moved, or the two tool-carriers can be moved towards each other. The safety device in accordance with the invention can be used in all these cases.

It is easy to comprehend that operating personnel are exposed to considerable risk when using a press brake machine, in particular to the risk of squashing or even amputating body parts. Accordingly, it has been known for a long time to provide press brake machines and the like with a safety device in order to avoid accidents as far as possible.

The prior art discloses a multitude of proposals for protective devices for press brakes and similar machines. Many proposals focus on the task of making safe the danger zone at the leading edge of the moving machine part as good as possible, in particular to reliably recognize dangerous encroachments into the working movement of the machine from different directions and/or in different operating situations. Numerous proposals, such as in U.S. Pat. No. 5,579,884, relate to arranging a plurality of optical barriers/light beams in the region of the leading edge of the moving machine part. As soon as at least one of these light beams in the working movement of the machine part is interrupted, an output signal is generated that stops the working movement of the machine.

There are also proposals to achieve a plurality of optical barriers using a camera on the receiving side, for example in DE 10 2004 058 472 A1. The camera is in this case illuminated over the entire area using a "large" light beam. Only selected pixel regions on the camera sensor are monitored and evaluated. These pixel regions trigger a switch-off signal if a shadow covers the light beam on the pixel region.

EP 1 674 785 B1 describes a camera-based safety device for making safe a press brake machine. Several different protective fields are illustrated. In addition to extremely small protective fields that amount to less than 10% of the total area of the field of view of the receiving device, large-area protective fields are also illustrated. In one embodiment, a large-area protective field comprises a plurality of unconnected, line-shaped segments. The line-shaped segments are arranged in parallel with the plane of movement defined by the leading edge.

In all cases, the question arises as to how dangerous encroachments into the movement path of a press tool can be reliably recognized without triggering unnecessary false alarms, the latter having an adverse effect on the productivity of the machine. In addition, it is also desired that a dangerous encroachment be recognized as quickly as possible in order to be able to switch off the machine quickly in the event of a danger. In so doing, all optical barriers and/or protective field geometries are a compromise in the protective field between the requirements of the working rate, the reliability of error recognition, the avoidance of false alarms and the production costs. Despite the numerous already known proposals, there is also the desire to provide a safety device that fulfills the conflicting requirements in the most optimum manner possible.

In addition, there is a desire to maintain the protective field until the end of the working movement, so that the machine operator is protected until the very end of the working movement. However, a problem arises in this case, because the leading safety barrier will already be interrupted by the second machine part and/or by the workpiece before the working movement is completed. The optical safety barriers must therefore be deactivated at the end of the working movement. This intentional deactivation is known as 'muting'. Without muting, the first machine part could not complete its working movement, since it would be switched off prematurely by the safety device.

DE 103 53 353 A1 discloses a camera-based safety device in which the entire area of the protective field is monitored and continuously reduced at the end of the working movement. However, such an approach requires a high level of computing capacity with the result that the costs for the practical implementation are high.

EP 1 387 121 B1 discloses a safety device having a plurality of individual optical safety barriers that are deactivated in sequence at the end of the working movement. Consequently, this known safety device makes it possible to provide a certain amount of protection of the operator until the completion of the working movement. However, the amount of protection is not yet optimum, since the number and the distribution of the safety barriers allows only rather rough steps when adjusting the protective field. In the moment in which an optical safety barrier is deactivated, the protective field being spanned "jumps" upwards and leaves a gap at the workpiece which is only re-closed with the further working movement of the first machine part.

SUMMARY OF THE INVENTION

In view of this background, it is an object of the present invention to provide an improved safety device of the type mentioned in the introduction for achieving optimum protection of the operator on a highly productive working machine.

It is another object to reduce computational expenditure required for achieving the protective function and therefore reducing computing loads.

In addition, it is an object to provide a safety device that makes it possible to provide optimum protection of the operator, in particular, at the end of the dangerous working movement.

According to a first aspect of the present invention, there is provided a safety device comprising a light transmitter and a light receiver arranged in a predefined relationship relative to a first machine part, said light transmitter generating a light beam that runs along a leading edge of the first machine part and illuminates the light receiver during a working movement of the first machine part, and said light receiver comprising an image sensor having a plurality of pixels for capturing an image produced by the light beam, comprising an evaluation unit designed to evaluate selected pixels from the plurality of pixels and to generate a stop signal for stopping the first machine part in response to the selected pixels, wherein the selected pixels span a protective field which has a two-dimensional cross section in the area of the leading edge and which runs ahead of the leading edge during the working movement, and comprising an optical measuring barrier arranged ahead of the protective field in the direction of the working movement, wherein the evaluation unit is configured to hold the protective field substantially stationary immediately above the workpiece at the end of the working movement by using the optical measuring barrier and by shifting the selected pixels synchronously with the working movement but in an opposite direction, and wherein the evaluation unit is further configured to reduce the two-dimensional cross section of the protective field at the end of the working movement in order to allow the first machine part to process the workpiece.

In accordance with another aspect, there is provided a safety device for a machine having a first machine part configured to perform a working movement towards a second machine part in order to process a workpiece at an end of the working movement, wherein the first machine part comprises a leading edge in the direction of the working movement, said leading edge defining a plane of movement, said safety device comprising a light transmitter, a light receiver, and an evaluation unit, wherein the light receiver is coupled to the first machine part such that it moves in advance of the leading edge during the working movement, wherein the light transmitter generates a light beam that illuminates the light receiver during the working movement, wherein the light receiver comprises an image sensor having a plurality of pixels in order to capture an image produced by the light beam, wherein the evaluation unit is designed to evaluate selected pixels from the plurality of pixels in order to establish a plurality of optical safety barriers and in order to establish at least one optical measuring barrier, said optical safety barriers running ahead of the leading edge during the working movement at a plurality of distances from the leading edge so as to span a protective field having a two-dimensional cross section in the area of the leading edge, and said optical measuring barrier running ahead of the protective field in the direction of the working movement, wherein the evaluation unit is further designed to generate a stop signal for stopping the first machine part in response to the optical safety barriers, wherein the evaluation unit is further designed to hold the protective field substantially stationary above the workpiece at the end of the working movement by using the optical measuring barrier and by shifting the respectively selected pixels synchronously with the working movement of the first machine part but in an opposite direction, and wherein the evaluation unit is further designed to mute the optical safety barriers sequentially one following the other before they are interrupted by the first machine part at the end of the working movement.

The new safety device is based on the idea to reduce the protective field in a step by step manner. Optical safety barriers are not all deactivated at the same time but are each deactivated successively shortly before the respective safety barrier is interrupted. Advantageously, the protective field is held substantially stationary manner at the workpiece by means of a first measuring barrier and the height of the protective field is reduced from above, so that the first machine part that continues to move downwards does not trigger a switch-off signal. In the case of the preferred use of separate optical safety barriers, the safety barriers are thus deactivated step by step from above downwards (muting from above) whilst the lower edge of the protective field is held at or directly above the workpiece.

Muting of the safety barriers from above is advantageous, since any encroachment into the movement path of the first machine part typically occurs towards the end of the working movement directly at the workpiece, possibly in order to correct the position of the workpiece shortly before the actual bending or cutting procedure. Muting from above guarantees that the particularly critical region at the workpiece is monitored uniformly and without any sudden changes. Any reduction of the protective field resulting from individual safety barriers being deactivated occurs away from the critical clamping site on the workpiece. In addition, muting from above allows for an implementation that requires a moderate computing capacity with respect to the evaluation unit and control unit, especially if the protective field is spanned by individual safety barriers that are at a spaced mutual disposition with respect to each other. The deactivation of the optical barriers and/or the reduction of the protective field from above is thus an innovative approach that provides optimum safety of the dangerous clamping site directly above the workpiece in the last part of the working movement.

Preferably, the new safety device is based on using a protective field having at least three interrelated lines of optical barriers. Two of the three lines lie substantially in parallel with the plane of movement and thus define a minimum width of the protective field transverse to the direction of movement. These two lines encompass an inner region of the protective field. The third orthogonal line "secures" the inner region that lies between the first and the second line against any encroachment in a direction parallel to the plane of movement. The substantially orthogonal arrangement of the three lines spans a relatively large protective field having comparatively few monitoring beams. The large protective field makes it possible to reliably recognize encroachments from different directions. Moreover, the separate barriers make it possible to monitor encroachments in very simple and quick manner. In addition, the substantially orthogonal arrangement makes it possible to read out selected pixels extremely quickly in the case of the preferred implementation of the safety device using a camera sensor.

Consequently, the new safety device makes it possible to provide optimum protection of the operator with rather small computing loads and accordingly a rather small computing capacity.

The three lines advantageously form a structure that is approximately U-shaped and is open in the direction of movement of the first machine part. In a particularly preferred embodiment, the third line at least partially forms the upper edge of the protective field.

These features contribute to an optimum protection of the operator of a machine, since they make it possible to provide effective protection with respect to operator entrapment in the direction of the working movement of the first machine part.

In a refinement, the first and the second line each comprise an upper end, wherein the upper end of the first line protrudes beyond the third line and wherein the upper end of the second line is flush with the third line.

This refinement further improves the protection of the operator of the machine. By increasing the protective field on one side, protection against operator entrapment in the direction of the working movement of the first machine part is improved on this side. This particularly applies if the protective field is increased on the side that faces the operator of the machine.

In a further refinement, the first line defines a first side edge of the protective field, wherein the first line is at a defined spacing with respect to the plane of movement.

Preferably, the defined spacing is greater than a finger's width and in particular greater than 20 mm. The first line forms the outer edge of the protective field on the operator side. This feature contributes to an optimum protection of the operator. Consequently, any encroachment into the plane of movement from the operator side can be recognized at an early stage.

In a further refinement, the second line is arranged approximately at the plane of movement.

Preferably, although the second line is arranged at the plane of movement, it does not lie in the plane of movement, rather slightly offset thereto. In other words, the second line is also arranged with a spacing to the plane of movement. However, this spacing is substantially smaller than the spacing between the plane of movement and the first line. The small spacing is particularly of advantage for bending boxes, since the number of false alarms caused by an upright part of the workpiece to be processed is reduced. On the other hand, the second line ensures important protection at the plane of movement.

In a further refinement, the protective field is spanned on both sides of the plane of movement, with the first line and the second line lying on different sides of the plane of movement.

This refinement provides for protection with respect to encroachments from the front side and from the rear side of the machine. Consequently, this refinement allows to refrain from using protection fences that prevent access to the machine rear side or at least to reduce the use of such fences.

In a further refinement, the safety device comprises a fourth optical safety barrier that together with the third line defines a second side edge of the protective field.

In this refinement, the third line intersects the second line and protrudes laterally beyond the second line. However, in order to achieve an extended side edge of the protective field, a fourth optical safety barrier is provided, which fourth optical safety barrier together with the free end of the third line defines the side edge of the protective field. The embodiment allows to achieve a high density of optical safety barriers at the dangerous plane of movement and also to achieve an extended, two-dimensional protective field on both sides of the plane of movement with a rather small number of safety barriers.

In a further refinement, the first and the second line each comprise a lower end, wherein a fifth optical safety barrier is arranged between the two lower ends, which fifth optical safety barrier together with the two lower ends defines a lower edge of the protective field.

Preferably, the fifth optical safety barrier is arranged in closer proximity to the first line and further away from the second line, and the spacing between the fifth optical barrier and the second line (and consequently the opening at the lower edge of the protective field) is greater than a finger's width. With this refinement, any encroachment into the protective field in a direction from diagonally below is easily recognized. However, the protective field simultaneously remains open which contributes to the reduction in the number of false alarms and keeps the number of optical barriers low.

In a further refinement, the machine comprises an overtravel path, wherein the number of optical safety barriers can be configured in dependence upon the length of the overtravel path.

This refinement makes it possible to optimize the computing load required to implement the protective function and also to further improve the avoidance of false alarms. In the case of a machine that has a long overtravel path, a high protective field is required in order to ensure that the machine reliably stops within its overtravel path in the event of any encroachment into the plane of movement. In contrast thereto, in the case of a machine that has a short overtravel path, a protective field that has less height is sufficient. Advantageously, the height of the protective field can be adjusted in a plurality of steps to match the length of the overtravel path. Preferably, as the length of the overtravel path reduces, the number of optical barriers lying beneath the third line also reduces, wherein the third line is in any case part of the protective field adjusted to the overtravel path irrespective of the length of the respective overtravel path.

Several embodiments are feasible for the practical implementation of this feature. In a first embodiment, the data from all the optical safety barriers are read into the evaluation unit, wherein in the evaluation unit only the data of those optical barriers that define the protective field adjusted to the overtravel path are evaluated. In contrast, in another embodiment only data from those optical barriers that define the protective field adjusted to the overtravel part are read into the evaluation unit.

In a further refinement, a first optical measuring barrier, which is in particular in the form of a first optical measuring field, is arranged below the second line.

Independently from the implementation of the protective field proposed here, this refinement is also in itself an inventive improvement of known safety devices including such safety devices that do not build the protective field from separate optical barriers but rather monitor the entire area using a camera sensor. The optical measuring field preferably is a selected pixel region on a camera sensor but, in principle, it can also be a separate light barrier. The optical measuring barrier is the first to be interrupted during the working movement of the first machine part in the direction towards the workpiece to be processed since said optical measuring barrier is arranged below the second line. Said optical measuring barrier is therefore interrupted by the workpiece before the workpiece enters the protective field. The early interruption of the measuring barrier can be advantageously used for the purpose of initiating a "soft" deceleration of the first machine part. Consequently, the loading on the machine, the machine vibration and the wear on the machine can be reduced. In addition, the optical measuring barrier is used in preferred embodiments for triggering the muting of the subsequent optical monitoring barriers. Use of an optical measuring barrier to initiate the muting makes it possible to achieve a precisely defined position for the commencement of the muting during the course of the working movement. In addition, the muting position automatically adjusts itself to a different thickness from one workpiece to another.

In a further refinement, a further optical measuring barrier is arranged above the first and/or second line, in particular in the form of a second optical measuring field.

In this refinement, the new safety device is able to estimate the actual length of the overtravel path of the first machine part after a switch-off signal, as is described in DE 10 2004 058 472 A1 cited in the introduction. In this respect, reference is made to this document with respect to the details in the case of the overtravel measuring process.

In a further refinement, the safety device preferably comprises a light transmitter and a light receiver, wherein at least the light receiver is coupled to the first machine part in such a manner that it moves in advance of the leading edge in the working movement of the first machine part, wherein the light transmitter generates a light beam that extends substantially in parallel with the edge and illuminates the light receiver, wherein the light receiver comprises an image sensor having a plurality of pixels in order to receive a locally resolved image of the light beam and wherein the optical barriers are implemented by means of selected pixels.

This refinement makes possible an extremely robust and cost effective implementation. It simplifies the process of adjusting the new safety device to suit the machine and renders it possible to change the protective field dimensions retrospectively in a simple manner. In addition, this embodiment makes it possible to implement the preferred muting from above in a very cost-effective and low-maintenance manner.

In a further refinement, the optical safety barriers of the new safety device each have a cross section that is substantially in the form of a square.

This refinement makes it possible to implement separate optical barriers in a single camera sensor in a particularly simple and cost-effective manner. The square shaped barriers can be implemented with selected pixel regions that are small and can be read out very quickly.

It goes without saying that the aforementioned features and the features still to be explained can be used not only in the respectively mentioned combination but also in other combinations or standing alone without in so doing departing from the scope of the present invention.

BRIEF DESCRIPTION OF THE DRAWINGS

Exemplary embodiments of the invention are explained in detail in the following description and illustrated in the drawing, in which.

DESCRIPTION OF PREFERRED EMBODIMENTS

Figure 1:
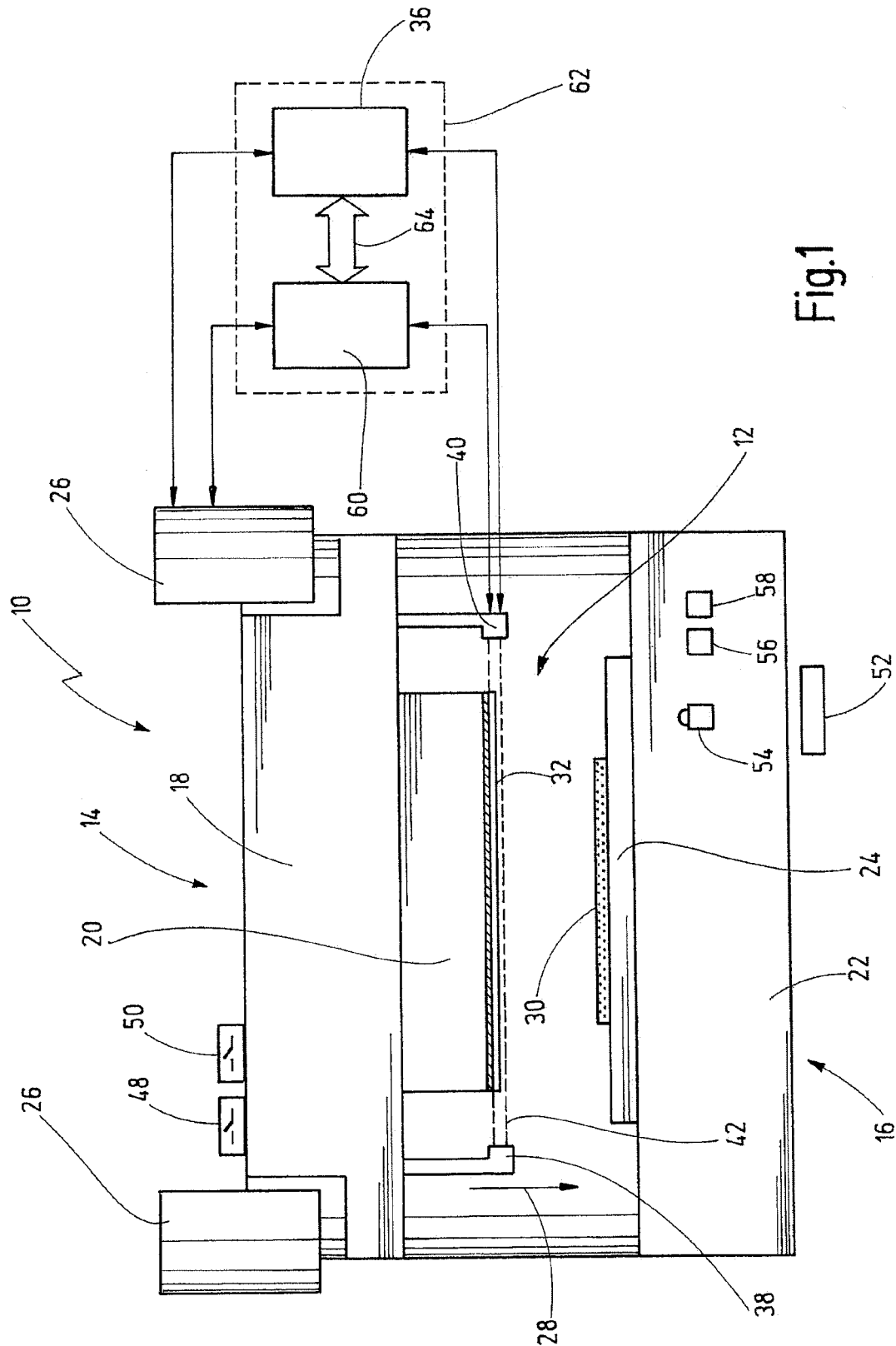
FIG. 1 shows a schematic illustration of a press brake machine with an exemplary embodiment of the new safety device.

In FIG. 1, a press brake as a preferred machine for the new safety device is designated as a whole by reference numeral 10. A safety device 12 according to an exemplary embodiment of the invention is used on the press brake 10 in order to prevent injury to operating personnel during the working operation of the press brake 10. However, it should be observed that the present invention cannot only be used in press brake machines but it can also be used in any kind of pressing machines and also in other machines in which two machine parts perform a working movement towards each other, such as in the case of stamping and cutting machines. The invention is not limited to machines where only one machine part is moved. The safety device according to the present invention can also be used in machines in which a plurality of machine parts is moved relatively with respect to each other.

The press brake 10 comprises a first, in this case upper machine part 14 and a second, in this case lower machine part 16. The first machine part 14 comprises an upper tool-carrier 18 on which an upper tool 20, such as a bending punch, is arranged. The second machine part 16 comprises a lower tool-carrier 22 on which a lower tool 24, such as a die, is arranged. The first machine part 14 can perform a working movement via a drive 26 in the direction of arrow 28. The upper tool 20 (punch) and the lower tool 24 (die) together form the pressing tool with which a workpiece 30 can be shaped. Workpiece 30 typically is a sheet metal part.

Upper tool 20 comprises a leading edge 32 that owing to the working movement 28 defines a plane of movement 34. Each encroachment of an object into the plane of movement 34, such as an encroachment of the hand of an operator, represents a dangerous situation, in particular, if the upper tool 20 has already drawn close to the lower tool 24. The safety device 12 with which an evaluation unit 36 is associated is used for detecting such encroachments in the region of the leading edge 32 in order to stop the working movement 28 of the press brake 10 in dependence thereon.

Safety device 12 comprises a light transmitter 38 and a light receiver 40 that are attached here in each case to the upper tool-carrier 18. The light transmitter 38 and the light receiver 40 are coupled to the upper tool-carrier 18 so that they move simultaneously with the working movement 28 of the upper tool 20. By virtue of being attached to the upper tool-carrier 18, the light transmitter 38 and the light receiver 40 move in advance of the leading edge 32. The light transmitter 38 generates a light beam 42 that extends in parallel with the leading edge 32 of the upper tool 20 and illuminates the light receiver 40. Accordingly, the light transmitter 38 and the light receiver 40 form a light barrier that monitors a protective area around the edge 32 of the upper tool 20, which protective area is defined substantially by the light beam 42.

Figure 3:
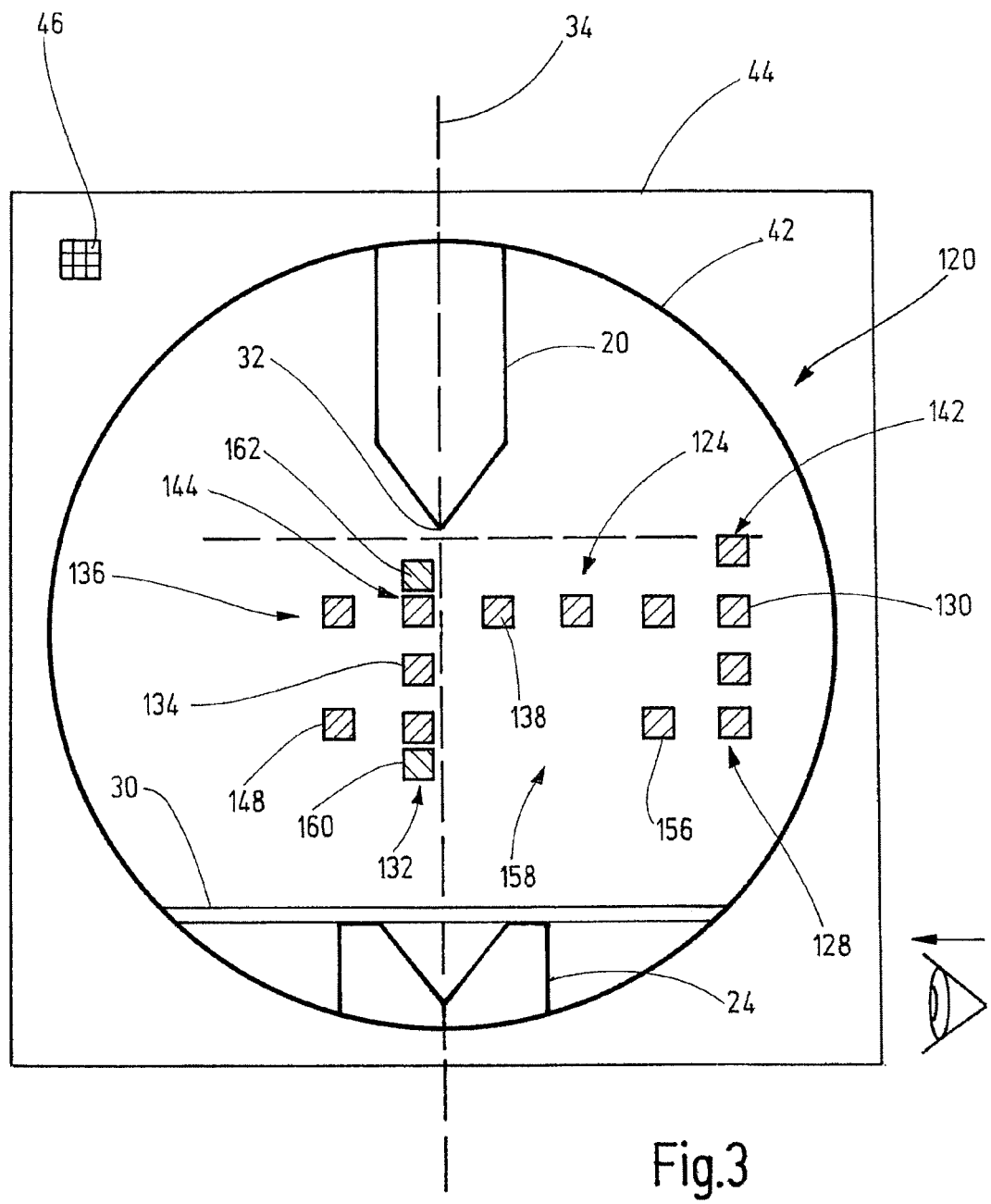
FIG. 3 shows a simplified illustration of an image of the light beam that illuminates the light receiver in the safety device shown in FIG. 1.

The light transmitter 38 comprises a light source that in a particularly preferred embodiment is a so-called high power-LED having a light yield of approx. 70 lm/W. However, it can, in principle, also be a laser diode, fluorescent tube, halogen lamp or another light source. Light receiver 40 comprises an image sensor 44 having a plurality of pixels 46. Preferably, said image sensor is an image sensor having a matrixlike arrangement of pixels 46, as illustrated in FIG. 3. The image sensor 44 is a CMOS image sensor having a logarithmic transducer characteristic curve in a preferred exemplary embodiment. In addition, light receiver 40 comprises an imaging optic having a focal point where an aperture diaphragm is arranged. The clear internal diameter of the aperture diaphragm is in a range of between approx. 50 μm up to 150 μm in the preferred exemplary embodiments. In one preferred exemplary embodiment, the clear internal diameter is approx. 75 μm.

From today's perspective, the exemplary embodiment illustrated in FIG. 1, in which both the light transmitter 38 and also the light receiver 40 move simultaneously with the working movement 28 of the upper tool 20, is preferred. However, the light transmitter 38 can, in principle, also be arranged in a stationary manner if it generates, for example, a light line or a light plane that lies in parallel with the plane of movement 34. In principle, the light receiver 40 can also be stationary, provided that it is able to receive an image of the light beam 42 at all relevant sites during the course of the working movement 28 of the upper tool 20.

An evaluation unit 36 is associated with safety device 12. The evaluation unit 36 can be arranged separately from the light transmitter 38 and the light receiver 40. As an alternative thereto, the evaluation unit 36 can be integrated fully or partially in the light transmitter 38 and/or in the light receiver 40. The evaluation unit 36 is used to control the light receiver 40 and, in response to signals provided by the light receiver 40, to generate an output signal in order to stop the working movement 28 of the upper tool 20. As far as the evaluation of the images received by the light receiver is concerned, this can occur either in the light receiver 40 itself or in the evaluation unit 36. As a consequence, the output signals provided by the light receiver 40 differ for these two alternatives.

The evaluation unit 36 executes an evaluation and control program. In this regard, the evaluation unit 36 receives signals from various switches and buttons. These switches and buttons include, for example, two end switches 48, 50, a foot button 52, an emergency-off button 54, an operation mode selection switch 56 and a quit button 58. The two end switches 48, 50 are only closed if the upper tool 20 is located in its top dead center position. The closed position of the end switch 48, 50 consequently signals that the press brake 10 is located in its starting position for performing an operation cycle. An operation cycle of the press brake 10 is commenced by actuating the foot button 52. In a dangerous situation, the operator can interrupt the working movement 28 of the upper tool 20 by actuating the emergency-off button 54. A protective field mode of the safety device 12 can be selected via the operation mode selection switch 56 and then quit via the quit button 58. The assignee of the present application markets preferred failsafe evaluation units under the trade name PSS® and under the trade name PNOZ®multi.

Typically, press brake 10 comprises in addition to the evaluation unit 36 an operation control unit 60 that controls the "normal" operation cycle. In principle, the operation control unit 60 can be combined with the evaluation unit 36, which is indicated by a housing 62 illustrated by a broken line. It is also feasible to integrate the evaluation unit 36 into the operation control unit 60.

The evaluation unit 36 and the operation control unit 60 can exchange data, which is indicated by arrow 64. The connection, illustrated in FIG. 1, of the light receiver 40 and the drive 26 to the evaluation unit 36 and the operation control unit 60 has merely a schematic character. For example, the illustration does not show the connection of both drives 26 to the evaluation unit 36 and the operation control 60. The illustration of isolators that are arranged between the evaluating unit 36 and the drive 26 and are used to separate the drive 26 from the supply voltage is likewise omitted. This omission is not intended to have a limiting effect.

Figure 2:
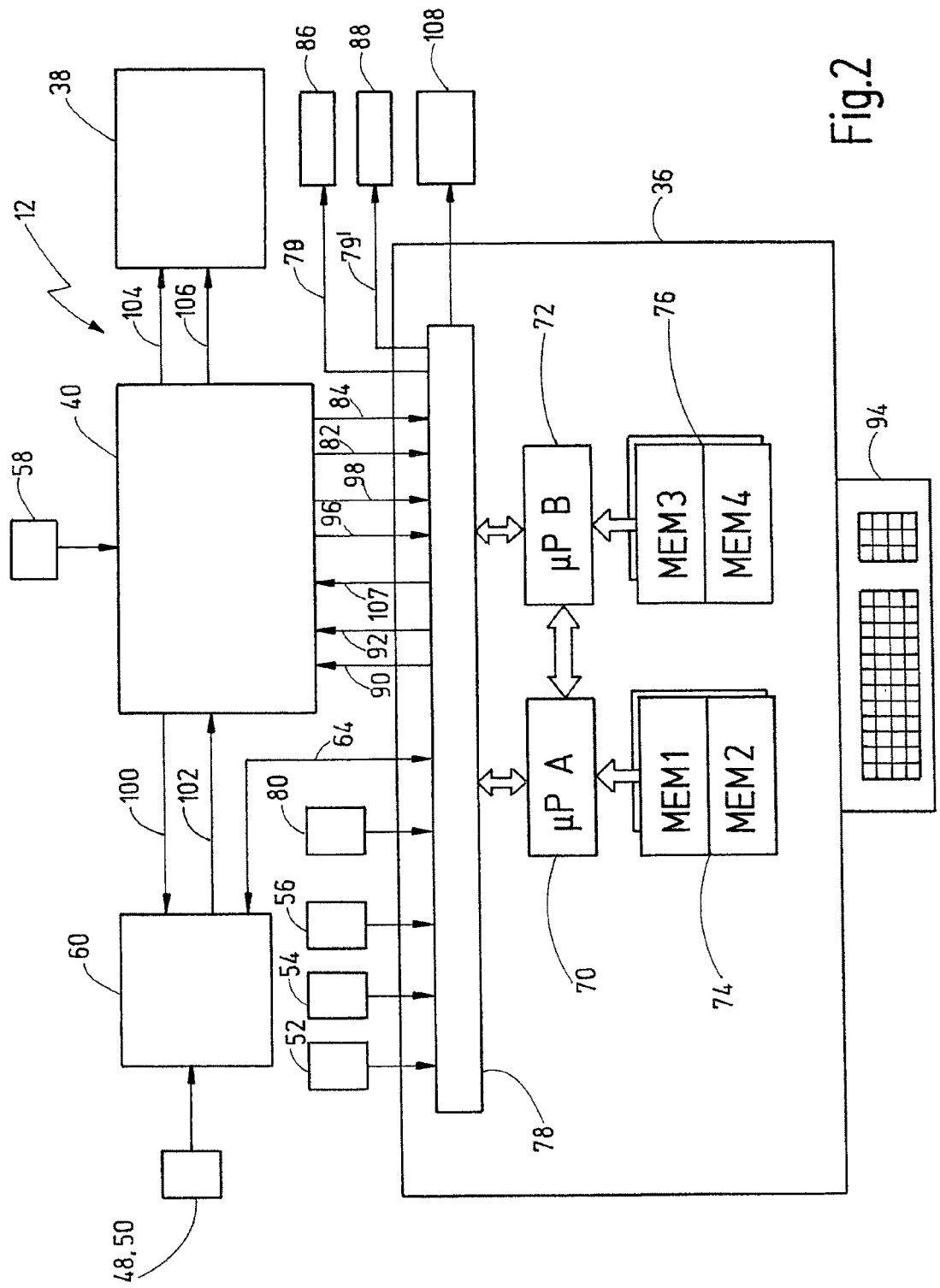
FIG. 2 shows a schematic illustration of the safety device shown in FIG. 1.

FIG. 2 shows in a schematic illustration the principle structure of the safety device 12.

The evaluation unit 36 is preferably embodied in a multi-channel redundant manner. This is illustrated in FIG. 2 by means of two processors 70, 72 that mutually monitor each other and can exchange their processing results. In particularly preferred embodiments, the processors 70, 72 are different, i.e., two different processor types are used in order to reduce the probability of a simultaneous error. Each of the two processors 70, 72 executes an evaluation and control program that is stored in respectively associated storage regions 74, 76.

An interface unit is designated by reference numeral 78 and by means of said interface the processors 70, 72 read input signals from inputs and write output signals to outputs. In a preferred exemplary embodiment, the processors 70, 72 inter alia generate a failsafe, preferably redundant output signal 79, 79' by means of which the working movement 28 of the upper tool 20 is terminated if a dangerous encroachment into the region below the leading edge 32 is detected.

The components and signals that are necessary for explaining the principle mode of operation of the safety device 12 are illustrated in FIG. 2. Consequently, this illustration is not claimed to be complete. For example, in the case of the evaluation unit 36, the illustration of diagnostic outputs is omitted.

The safety device 12 comprises internal test functions so that it can make sure that the press brake 10 is in a safe state even if a malfunction occurs in said safety device or in a device connected to said safety device. Very high demands are therefore placed on the safety device 12 to make it intrinsically failsafe. The safety device 12 must comply with predetermined safety standards that are laid down, for example, in European Standard EN 954-1 or in a similar standard, such as IEC 61508 or EN ISO 13849-1. The safety device 12 at least complies with safety category 3 of European Standard EN 954-1 or its Safety Integrity Level (SIL) achieves a least the level 2 in accordance with IEC 61508. The light transmitter 38 and the light receiver 40 together form a non-contact protective device (BWS) that complies with Type 4 of Standard EN 61496-1.

An operation mode of safety device 12 is described in the following with respect to a press stroke. The operator of the press brake 10 initiates a press stroke by actuating foot button 52. The upper tool 20 starts from the top dead point and moves towards lower tool 24. This generally occurs at a relatively high closing rate (for example >10 mm/s; rapid advance). After a defined stroke of the upper tool 20, the evaluation unit 36 initiates a brake procedure. If upper tool 20 has achieved a lower closing rate (for example ≤10 mm/s; creep advance) this is indicated to the evaluation unit 36 by means of a sensor unit 80 embodied for this purpose. The sensor unit is arranged on the press brake 10 and generates a corresponding creep signal. This can be advantageously used in some embodiments to deactivate the safety device (muting), so that the upper tool 20 can complete the working movement despite the monitoring beams being interrupted by the workpiece 30. The bending procedure is terminated once the upper tool 20 has arrived at the lower reversing point and said upper tool returns to the top. In some exemplary embodiments, no change is made from the rapid advance to the creep advance since the new muting method makes it possible for the safety device to monitor the dangerous opening gap until the conclusion of the procedure.

If an object interrupts the protective field during the working movement 28 without muting having taken place, this is indicated by protective field status signals 82, 84. As a consequence, the evaluating unit 36 trips contactors 86, 88 arranged between drive 26 (not illustrated) and a supply voltage (not illustrated), in such a manner that drive 26 is separated from the supply voltage. Consequently, the working movement 28 of the upper tool 20 is interrupted. However, the upper tool 20 continues to move the extent of its overtravel path. It is possible in some exemplary embodiments that the working movement 28 of the upper tool 20 can be further continued and the bending procedure terminated as soon as the object is removed from the protective field.

The light receiver 40 comprises two output switching elements. Consequently, two redundant protective field status signals 82, 84 are generated. The two protective field status signals 82, 84 signal the status of the protective field. If the protective field is free, said signals assume the value 1, if on the other hand the protective field is interrupted, said signals assume the value 0.

In a preferred exemplary embodiment, the protective field comprises three protective field regions, namely a front, a middle and a rear protective field region. In the preferred exemplary embodiments, the middle protective field region substantially comprises the optical barriers of the second line. The front and rear region comprise the optical barriers that are arranged upstream and downstream of the second line as seen in each case from the side of the operator.

It is optionally possible by deactivating the front and/or the rear protective field region to adjust the protective field to suit the different processing procedures. For the purpose of adjusting the protective field, the operator activates an operation mode selection switch 56. Each position of the operation mode selection switch 56 is allocated a processing and/or bending task and thus a protective field mode. Preferably, four different protective field modes are as follows:

STANDARD protective field mode in which the full protective field having all optical barriers is available. This protective field mode is primarily used on flat workpieces.

BOX BENDING protective field mode in which a reduced protective field is used, said reduced protective field comprising the optical barriers of the middle and rear protective field region. This protective field mode is advantageously used in the case of workpieces that are to be bent a number of times, for example in the case of a box. Since it is to be expected in the case of this processing procedure that the optical barriers of the front protective field region are interrupted, these barriers are deactivated. Consequently an interruption does not result in a false alarm being triggered and the working movement 28 being stopped.

STOP protective field mode in which a reduced protective field is used, said reduced protective field comprising the optical barriers of the front and middle protective field region. This protective field mode is used if a rear stop reaches as far as the close proximity of the plane of movement 24. Since it is expected in the case that the optical barriers of the rear protective field region are to be interrupted, these barriers are deactivated.

BOX BENDING WITH STOP protective field mode in which a reduced protective field is used, said reduced protective field comprising only the optical barriers of the two lines. This protective field mode combines the BOX BENDING and STOP modes.

The operator must quit a selected protective field mode having a reduced protective field by actuating the quit button 58. A press stroke is only performed with reduced protective field after the quit process is completed. The signal generated by the quit button 58 is transmitted to the light receiver 40. A protective field mode having a reduced protective field is preferably only active for one press stroke. In the event that a further press stroke is to be performed with a reduced protective field, then it is necessary to re-select the desired protective field mode via the operation mode selection switch 56 and subsequently quit said mode by actuating the quit button 58.

In dependence upon the selected protective field mode, the evaluation unit 36 generates protective field mode signals 90, 92 that are transmitted to the light receiver 40. Consequently, the light receiver 40 can adjust the geometry of the protective field to suit the processing procedure to be performed. Since the two protective field mode signals 90, 92 can in this case each assume two states, it is possible to have here a total of four protective field modes. The inputs of the light receivers 40 are embodied in a failsafe manner for receiving the protective field mode signals 90, 92.

The overtravel path is the distance that is still to be travelled by the upper tool 20 once an encroachment into the protective field has been detected. When operating the press brake 10, it is necessary to ensure that, despite the overtravel path, the upper tool 20 reliably comes to a stop in front of an object that is encroaching in the plane of movement 34. For this reason, the height of the protective field in this case can be adjusted to suit the overtravel path of the press brake 10, as described in principle in DE 202 17 426 U1. In one case, the length of the overtravel path is input via a keypad 94 and stored in the safety device 12, preferably in the light receiver 40, during the configuration of the safety device 12. The optimum height of the protective field is then determined in response to the value stored for the length of the overtravel path. The arrangement of the keypad 94 on the evaluation unit 36 is not intended to have a limiting effect. For example, the keypad 94 can also be arranged on the light receiver 40.

The light receiver 40 has further inputs and outputs. For example, a press status signal 102 originating from the operation control unit 60 is transmitted to the light receiver 40. The press status signal 102 informs the light receiver 40 that the upper tool 20 is located at the top reversing point. The light receiver 40 generates a switching signal 104, with which it can switch the light source of the light transmitter 38 on and/or off. In addition, the light receiver 40 generates a control signal 106 with which it can control the intensity of the light source of the light transmitter 38. In addition, a set-up signal 107 originating from the evaluation unit 36 is transmitted to the light receiver 40 and said set-up signal signals to the light receiver 40 that the press brake 10 is located in a SET-UP operation mode. If the press brake 10 is located in the SET-UP operation mode, the safety functions of the safety device 12 are deactivated.

The evaluating unit 36 is designed for controlling valves 108. The valves 108 can be a safety valve and a suction valve.

FIG. 3 shows a simplified illustration of an image of the light beam that illuminates the light receiver in the safety device.

As is evident from FIG. 3, light beam 42 has in this case a circular cross section that illuminates the image sensor 44. The light transmitter 38 is arranged below the upper tool 20 such that the lower tip of the upper tool 20 including the edge 32 create a silhouette in the image 120. The lower tool 24 together with the workpiece 30 also create a silhouette at the end of the working movement. The situation illustrated in FIG. 3 demonstrates the case that the upper tool 20 has already drawn close to the lower tool 24.

The image sensor 44 comprises a plurality of pixels 46 by means of which the received image 120 is locally resolved. A number of pixels is selected from the pixels 46, which number is monitored with regard to whether or not the light beam 42 can be detected on these selected pixels. Consequently, the selected pixels form optical safety barriers 130, 134, 138 that in each case trigger a switch-off signal 79, 79' if they are interrupted by an object. The optical safety barriers 130, 134, 138 are illustrated shaded with inclined lines in FIG. 3 and in this case each has a rectangular, preferably substantially square-shaped, cross section.

The light receiver 40 is coupled to the first machine part 14 in such a manner that it moves in advance of edge 32 in the working movement 28 of the first machine part 14. The optical barriers therefore move in the working movement 28 in such a manner that they move in advance of the edge 32. The optical barriers span a protective field 124 that has a two-dimensional cross section.

The optical safety barriers form in this case three lines, namely a first line 128 having first optical barriers 130, a second line 132 having second optical barriers 134 and a third line 136 having third optical barriers 138. The first line 128 and the second line 132 lie in parallel with each other at a first spacing and in parallel with the plane of movement 34. The third line 136 lies between the first line 128 and the second line 132 and connects them. The third line 136 lies in this case in an orthogonal manner with respect to the plane of movement 34. The lines 128, 132 and 136 are interrelated and form a U-shape that is open towards the bottom (in the direction of the working movement). In the illustrated preferred exemplary embodiment, the third line 136 intersects the two parallel lines 128, 132, wherein said third line abuts in a flush manner with the first line 128 on the operator side of the machine, whereas on the side remote from the operator said third line protrudes laterally beyond the second line 132.

The first line 128 comprises an upper end 142 and the second line 132 comprises an upper end 144. The upper end 142 protrudes in this case beyond the third line 136, whereas the upper end 144 is flush with the third line 136.

The first line 128 forms a first side edge of the protective field 124. In so doing, the first line 128 is at a relatively large spacing with respect to the plane of movement 34. The spacing in this case is considerably greater than a finger's width. The second line 132 extends approximately at the plane of movement 34 but offset towards the side remote from the operator. Consequently it comprises a very small spacing with respect to the plane of movement 34.

As is evident from the illustration in FIG. 3, the first line 128 and the second line 132 lie on different sides of the plane of movement 34. In order to improve the safety of the machine on the side remote from the operator, a fourth optical safety barrier 148 is arranged in this case on the side of the plane of movement 34 on which side the second line 132 lies. The fourth optical safety barrier 148 defines together with the third optical safety barrier at the free end of the third line a second side edge of the protective field 124.

A fifth optical safety barrier 156 is arranged in this case between the lower ends of the first and second line 128 and 132. An opening 158 that is greater than a finger's width is left between the first safety barrier 156 and the second line. The fifth optical safety barrier 156 defines together with the two lower ends of the line 128, 132 the lower edge of the protective field 124.

A measuring beam that runs ahead and is in the form of a measuring field 160 is arranged in this case below the protective field. The measuring field 160 that is running ahead is formed by selected pixels and triggers a sequential muting of the optical barriers 130, 134, 138, 148, 156. In the preferred exemplary embodiment, the safety device is switched into a special muting mode once the measuring field 160 is interrupted. In this special muting mode, the protective field is held stationary at the dangerous clamping point directly above the workpiece 30 by means of the measuring field 160, and the optical barriers 130, 134, 138, 148, 156 are deactivated successively from the top in a downwards direction, in each case shortly prior to the upper tool 20 entering the protective field that is now spatially stationary. In the preferred exemplary embodiments, the optical safety barriers 130, 134, 138, 148, 156 and the measuring field 160 are held stationary directly above the clamping point, by virtue of the fact that the pixels selected for evaluation are shifted synchronously with respect to the working movement of the tool, but in the opposite direction (i.e. upwards in the present case). In some preferred exemplary embodiments, the arrangement and distribution of the optical barriers 130, 134, 138, 148, 156 can be different in the special muting mode than in the preceding phase of the working movement in which the measuring beam 160 has not yet contacted the workpiece (i.e. prior to the special muting mode).

Figure 4:
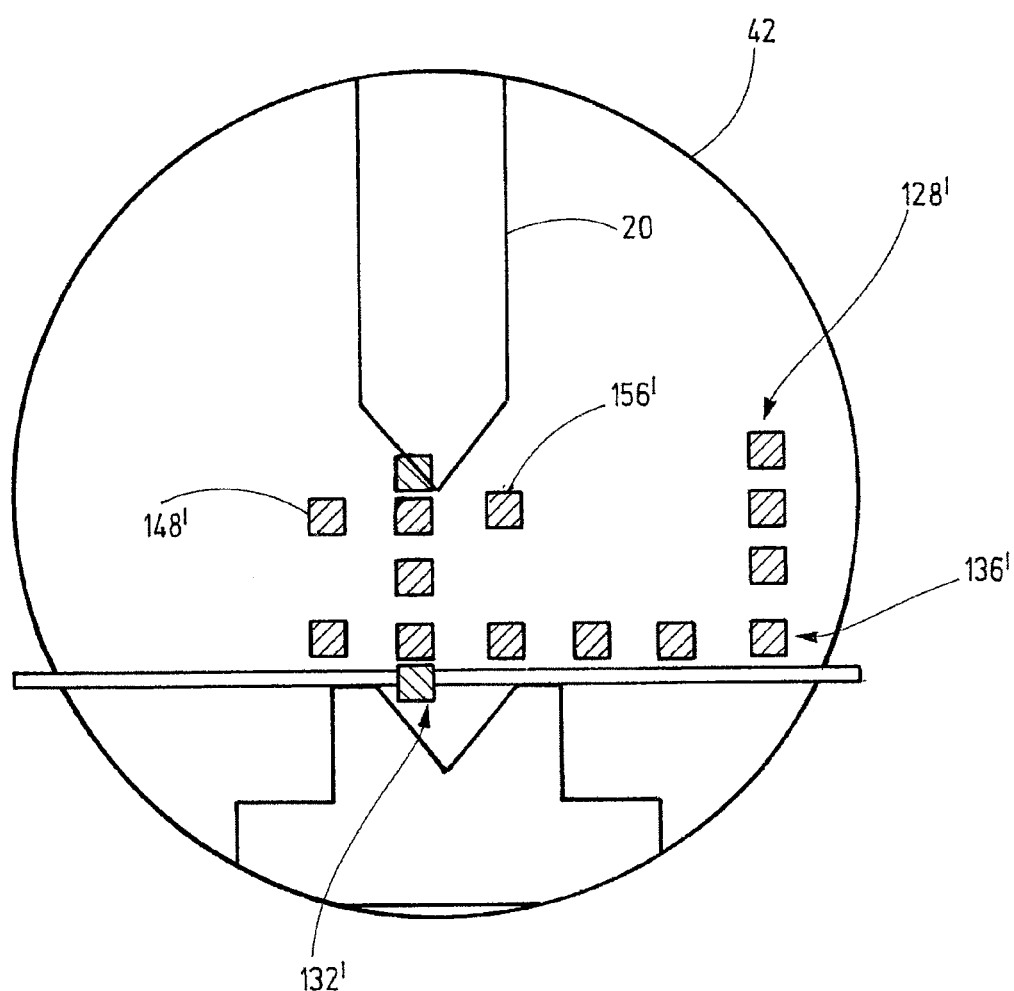
FIG. 4 shows a simplified illustration of the image at the commencement of the new muting process.

In a preferred exemplary embodiment, the third line 136 is moved to the lower edge of the protective field with the commencement of the special muting mode, so that the three lines 128, 132 and 136 now form a U-shape that is open to the top or another pot-shaped structure. Such an arrangement and distribution of the optical safety barriers 130, 134, 138, 148, 156 at the commencement of the muting mode is illustrated by way of example in FIG. 4. In the special muting mode, the upper tool therefore enters from above into a pot-shaped, at least largely stationary, protective field that lies directly above the workpiece. In some variants of this exemplary embodiment, the first line 128' can comprise further barriers 130' that extend the line 128' upwards in the opposite direction to the direction of movement of the upper tool, so that an even higher "protective wall" is formed on the operator side to prevent encroachments in an inclined direction from above. In addition, line 128' can be inclined diagonally with respect to the upper tool and/or further optical safety barriers can be arranged between the line 128' and the upper tool.

In the preferred exemplary embodiment, the length of the overtravel path is repeatedly checked during the operation of the press brake 10 and compared with a previously stored value. If it is established during the checking procedure that the measured length of the overtravel path is greater than the stored value, an error signal is generated. The length of the overtravel path is advantageously monitored according to a method and using an evaluation and control unit, as are described in DE 10 2004 058 472 A1. In the exemplary embodiment illustrated here, an additional measuring beam 162 is arranged above the second line 132 for the purpose of monitoring the overtravel path. The process of measuring the length of the overtravel path commences as soon as the protective field status signals 82, 84 indicate that one of the optical safety barriers 130, 134, 138, 148, 156 is interrupted. The measuring field 162 is evaluated once the upper tool 20 has come to a standstill. If it is established during this evaluation that the measuring field 162 has not been interrupted, this means that the overtravel path lies within the region predetermined by the stored value. If, on the other hand, it is established that the measuring field 162 is interrupted, then the overtravel path is too long. The overtravel path is preferably measured and/or checked in the light receiver 40, wherein the result is transmitted to the evaluation unit 36 via two failsafe outputs by means of two redundant overtravel path measuring signals 96, 98. In so doing, the overtravel measuring signals 96, 98 assume, for example, the value 1 if the length of the overtravel path lies within the predetermined range and assume the value 0 if the length of the overtravel path lies outside the predetermined range.

In some exemplary embodiments, the number of optical safety barriers 130, 134, 138, 148, 156 to be evaluated can be dependent upon the length of the overtravel path and can be configured by the operator as is described in DE 202 17 426 U1, which is incorporated herein by reference.

What is claimed is:

1. In a machine having a first machine part configured to perform a working movement towards a second machine part in order to process a workpiece at an end of the working movement, said first machine part comprising a leading edge in the direction of the working movement, a safety device comprising:
    a light transmitter and a light receiver arranged in a predefined relationship relative to the first machine part, said light transmitter generating a light beam that runs along the leading edge and illuminates the light receiver during the working movement, and said light receiver comprising an image sensor having a plurality of pixels for capturing an image produced by the light beam,
    an evaluation unit designed to evaluate selected pixels from the plurality of pixels and to generate a stop signal for stopping the first machine part in response to the selected pixels, wherein the selected pixels span a protective field which has a two-dimensional cross section including an upper region in the area of the leading edge, the protective field moving with the first machine part ahead of the leading edge during the working movement, and
    an optical measuring barrier arranged ahead of the protective field in the direction of the working movement,
    wherein the evaluation unit is configured to hold the protective field substantially stationary immediately above the workpiece at the end of the working movement in response to the optical measuring barrier and sequentially muting the selected pixels synchronously with the working movement starting with the selected pixels in said upper region, and
    wherein the evaluation unit is further configured to reduce the two-dimensional cross section of the protective field at the end of the working movement in order to allow the first machine part to process the workpiece.

2. The safety device of claim 1, wherein the selected pixels define a plurality of optical safety barriers that span the protective field.

3. The safety device of claim 2, wherein the optical safety barriers form at least three lines of optical safety barriers, wherein a first line having first optical safety barriers and a second line having second optical safety barriers are arranged approximately in parallel with each other and a third line having third optical safety barriers extending transverse from the first line to the second line.

4. The safety device of claim 3, wherein the leading edge defines a plane of movement, and wherein the first line and the second line each extend substantially parallel with respect to the plane of movement.

5. The safety device of claim 4, wherein the protective field is spanned on both sides of the plane of movement, with the first line and the second line being arranged on different sides of the plane of movement.

6. The safety device of claim 4, wherein the second line is arranged approximately at the plane of movement.

7. The safety device of claim 4, wherein the third line extends orthogonally with respect to the plane of movement.

8. The safety device of claim 3, wherein the third line at least partially forms an upper edge of the protective field during the working movement.

9. The safety device of claim 3, wherein the first line and the second line each comprise an upper end, and wherein the upper end of the first line protrudes beyond the third line and the upper end of the second line is flush with the third line.

10. The safety device of claim 3, wherein the first line defines a first edge of the protective field.

11. The safety device of claim 3, wherein the optical safety barriers comprise a fourth optical safety barrier that together with the third line defines a second side edge of the protective field.

12. The safety device of claim 3, wherein the first and the second line each comprise a lower end, with a fifth optical barrier being arranged between the lower ends.

13. The safety device of claim 1, wherein the first machine part moves along an overtravel path after the stop signal is generated by the evaluation unit, said evaluation unit being designed to evaluate the selected pixels as a function of the overtravel path.

14. The safety device of claim 1, comprising a further optical measuring barrier which is arranged between the first machine part and the protective field.

15. The safety device of claim 1, wherein the evaluation unit is designed to establish the optical measuring barrier using the plurality of pixels.

16. The safety device of claim 1, wherein the optical safety barriers each have a rectangular cross section.

17. The safety device of claim 1, wherein the evaluation unit holds the protective field substantially stationary in response to an interruption of the optical measuring barrier.

18. The safety device of claim 1, wherein the light transmitter and light receiver are arranged on opposite ends of said first machine part so as to move with said first machine part.

19. The safety device of claim 18, wherein the evaluation unit, upon holding the protective field substantially stationary, shifts the selected pixels synchronously with the working movement but in an opposite direction to said working movement.

20. A safety device for a machine having a first machine part configured to perform a working movement towards a second machine part in order to process a workpiece at an end of the working movement, wherein the first machine part comprises a leading edge in the direction of the working movement, said leading edge defining a plane of movement, said safety device comprising:
    a light transmitter, a light receiver, and an evaluation unit,
    wherein the light receiver is coupled to the first machine part such that it moves in advance of the leading edge during the working movement,
    wherein the light transmitter generates a light beam that illuminates the light receiver during the working movement,
    wherein the light receiver comprises an image sensor having a plurality of pixels in order to capture an image produced by the light beam,
    wherein the evaluation unit is designed to evaluate selected pixels from the plurality of pixels in order to establish a plurality of optical safety barriers and at least one optical measuring barrier, said optical safety barriers running ahead of the leading edge during the working movement at a plurality of distances from the leading edge so as to span a protective field having a two-dimensional cross section in the area of the leading edge, and said optical measuring barrier running ahead of the protective field in the direction of the working movement,
    wherein the evaluation unit is further designed to generate a stop signal for stopping the first machine part in response to an interruption of the optical safety barriers,
    wherein the evaluation unit is further designed to hold the protective field substantially stationary above the workpiece at the end of the working movement in response to an interruption of the optical measuring barrier and by shifting the respectively selected pixels synchronously with the working movement of the first machine part but in an opposite direction to said working movement, and wherein the evaluation unit is further designed to mute the optical safety barriers sequentially one following the other before they are interrupted by the first machine part at the end of the working movement.

21. The safety device of claim 20, wherein the optical safety barriers form at least three lines of optical safety barriers, wherein a first line having first optical safety barriers and a second line having second optical safety barriers are arranged approximately in parallel with respect to the movement plane, and wherein a third line having third optical safety barriers extends transverse to the movement plane from the first line to the second line.

22. The safety device of claim 21, wherein the second line is arranged approximately at the plane of movement.

23. The safety device of claim 20, wherein the two-dimensional cross-section of the protective field has an upper region in the area of said leading edge, and further wherein said evaluation unit sequentially mutes the optical safety barriers starting with the optical safety barriers in said upper region.

* * * * *